(12) United States Patent
Dietz et al.

(10) Patent No.: US 11,681,067 B2
(45) Date of Patent: Jun. 20, 2023

(54) SEPARATION ASSEMBLY FOR HANDHELD METAL DETECTORS

(71) Applicant: Purdue Research Foundation, West Lafayette, IN (US)

(72) Inventors: James Eric Dietz, Lafayette, IN (US); Anthony David Hustedt, Chesapeake, VA (US); Michael Patrick Scott, Bethlehem, PA (US); Maria Nicole Carter, Oconomowoc, WI (US); Blake Peter Wesling, Villa Park, IL (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/563,717

(22) Filed: Dec. 28, 2021

(65) Prior Publication Data

US 2022/0206178 A1 Jun. 30, 2022

Related U.S. Application Data

(60) Provisional application No. 63/131,378, filed on Dec. 29, 2020.

(51) Int. Cl.
*G01V 3/15* (2006.01)

(52) U.S. Cl.
CPC .................................. *G01V 3/15* (2013.01)

(58) Field of Classification Search
None
See application file for complete search history.

(56) References Cited

U.S. PATENT DOCUMENTS

2015/0035521 A1* 2/2015 Manneschi ............ G01V 3/081
324/228

FOREIGN PATENT DOCUMENTS

CN 207923193 U * 9/2018

* cited by examiner

*Primary Examiner* — Patrick Assouad
*Assistant Examiner* — Haidong Zhang
(74) *Attorney, Agent, or Firm* — Hartman Global IP Law; Gary M. Hartman; Domenica N. S. Hartman

(57) ABSTRACT

A separation assembly for use with handheld metal detectors. According to one aspect, the separation assembly is mounted to a handheld metal detector having a blade containing transmission and receiver components of the handheld metal detector. The separation assembly includes at least a first separation member formed of a nonferromagnetic material, and the first separation member is spaced a lateral separation distance from the blade of the handheld metal detector. The separation assembly may be incorporated as a permanent and integrated part of a handheld metal detector, or separately manufactured and installed on a handheld metal detector.

19 Claims, 2 Drawing Sheets

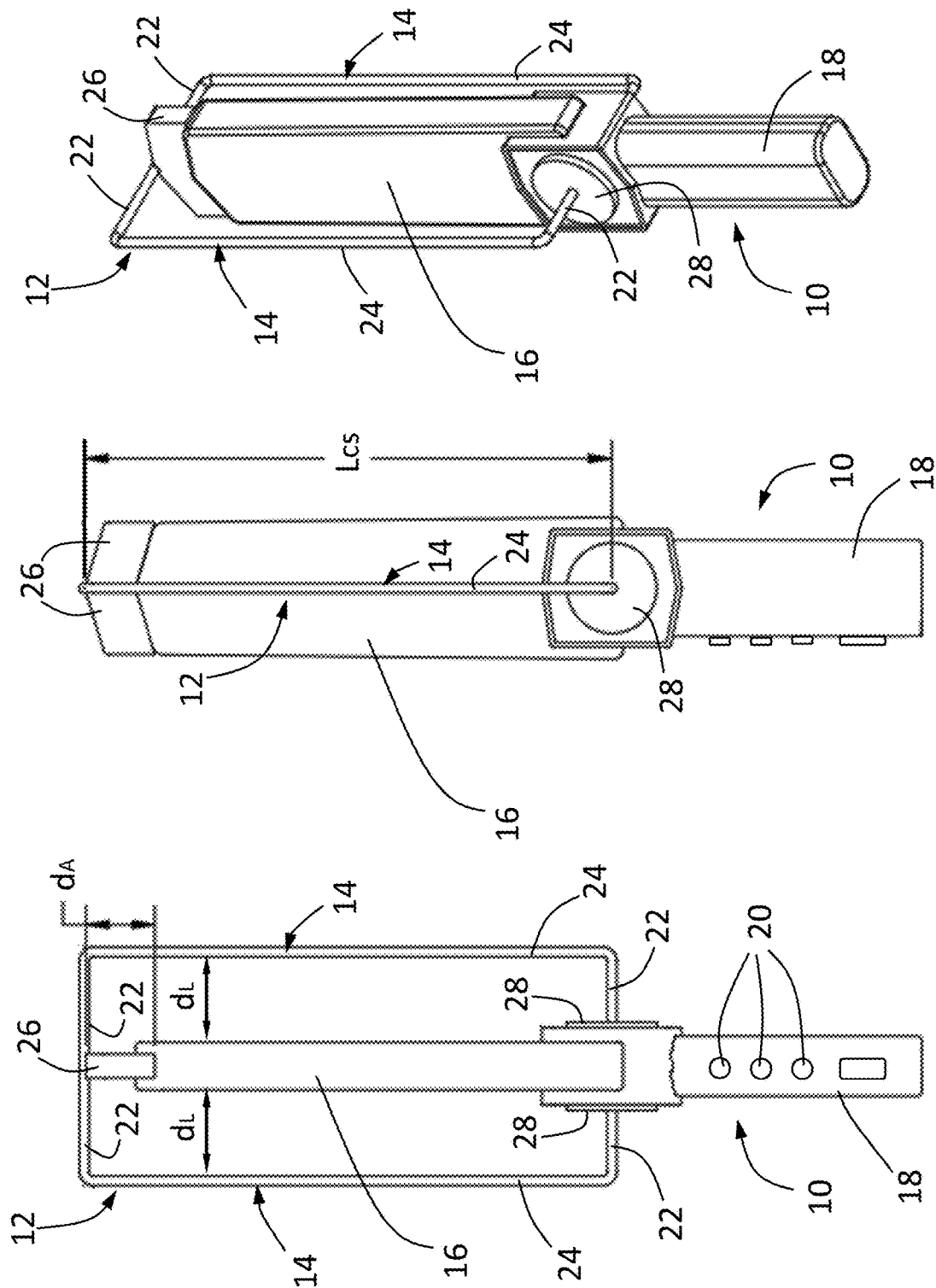

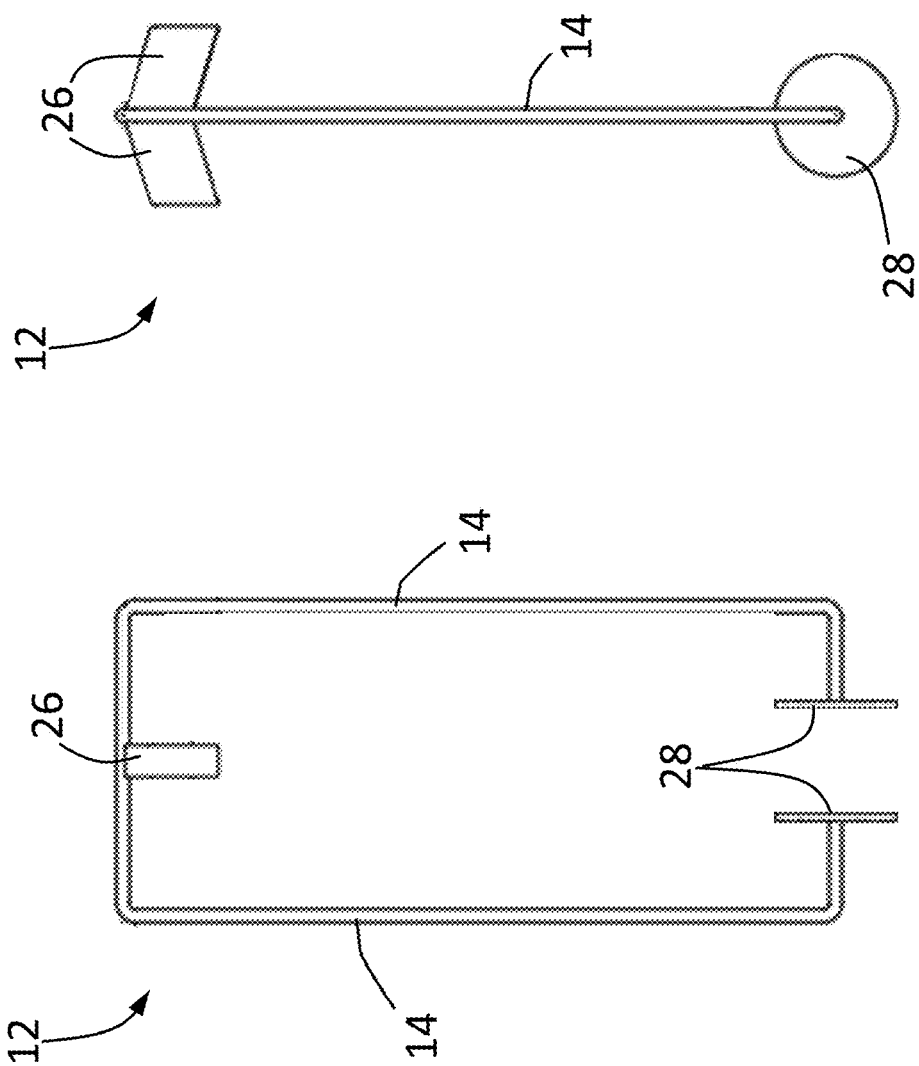

SEPARATION ASSEMBLY FOR HANDHELD METAL DETECTORS

CROSS-REFERENCE TO RELATED APPLICATIONS

This application claims the benefit of U.S. Provisional Application No. 63/131,378, filed Dec. 29, 2020, the contents of which are incorporated herein by reference.

BACKGROUND OF THE INVENTION

The present invention generally relates to equipment used to detect metallic objects. The invention particularly relates to a separation assembly for a handheld metal detector.

As the term is used herein, a handheld metal detector (HHMD) refers to a portable security tool used for the detection of metallic objects while conducting personal screenings of individuals at certain venues and situations that require or benefit from some level of security protocol, as nonlimiting examples, sports arenas, concerts, airport, prisons, night clubs, courthouses, schools, hospitals, and privately-owned corporate properties. HHMDs are often used by security personnel (operators) as a secondary screening process when screening performed with a walk-through metal detector (WTMD) or body scanner has activated an alarm circuitry. HHMD may also be used as part of a primary screening process when venues deem increased temporary security measures are necessary or where WTMD and body scanners are unavailable.

HHMDs operate by producing a small magnetic field around a transmission component and a receiver component. When a metal object enters this magnetic field, an electrical field is created which induces an anomaly in the magnetic field that is detected by the receiver component. The detection of an anomaly can be used to activate an alarm circuitry of the HHMD, which can generate visual and/or aural signals, such as a flashing light or a sound to notify the security personnel that a metallic object is present. This is known as the active-illumination technique.

To ensure the proper function of an HHMD, there are several points that security personnel should consider. Like their walkthrough counterparts, HHMDs must be properly calibrated and tested to ensure proper operation and accurate detection. To do this, security personnel should consult the HHMD's user manual and follow the manufacturer's recommended processes. The proper function of an HHMD also depends on properly trained security personnel. As a nonlimiting example, a typical HHMD should be placed at a distance of at least two inches (about 5 cm) from a targeted individual to be screened in order to avoid detection of innocuous items (e.g., zippers, jean rivets, etc.), but no more than about five inches (about 13 cm) to ensure detection of any large metallic items that may be present.

One of two screening patterns is typically followed: either a comprehensive sweep of all surfaces of the targeted individual's body, or a truncated "U-shaped" pattern around the targeted individual's body. Before any screening pattern is commenced, security personnel should advise the targeted individual of the procedure to take place and to remove any bulky items of clothing that might interfere with the screening process. Security personnel should instruct the targeted individual to stand with their feet shoulder width apart, arms outstretched, palms facing up and open, and then commence the predetermined screening pattern appropriate for the prevailing security and environmental conditions. The comprehensive pattern is conducted by starting at the top right shoulder/torso area and moving across the entirety of the individual being screened. The screening process should be done to the front and back of the targeted individual, paying close attention to the waistline (i.e., inspecting belts, doing pat-downs if necessary), and groin areas. Time and space limitations may result in the utilization of the U-shaped screening technique. This process allows for a faster screening flow rate. U-shaped screening techniques usually start at the top right shoulder/torso area, moving down to the right foot, then to the left foot, and finally up to the top left shoulder/torso area.

HHMDs offer several advantages over other screening techniques, such as portability and adaptability in more crowded spaces. However, security personnel must take into consideration proper training on the use of HHMDs to ensure a proper application of this technology. Shortfalls in the use of HHMD technology have been routinely reported and observed during field research data collection. Some venues have been documented as struggling with this technology to the point of abandoning its use. Inadequate training is often cited as the primary factor driving the under-performance of HHMDs. The relatively simply outward appearance of an HHMD can obscure its deceptively complicated operation, requiring security personnel to understand how the manner in which they use an HHMD can impact the detection sensitivity of the HHMD. When security personnel hold the HHMD too far from a targeted individual being inspected, they effectively turn down the detection sensitivity to a point where only the largest metallic objects are detected, if anything is detected at all. When security personnel hold the HHMD too close to a targeted individual, the detection sensitivity is significantly increased, resulting in alarms for any instance of metallic objects being present.

While other metal detecting systems allow for standardized settings to be employed in order to detect anticipated threat items and allow innocuous metallic items such as zippers and pocket rivets to pass without additional scrutiny and attention of security personnel, HHMDs, which rely on the security personnel to control the sensitivity, have been often found to be routinely misused, resulting in over and under sensitivity conditions. There have been some HHMDs produced with adjustable sensitivity, but these systems require even more security personnel knowhow, where the user must understand the additional controls as well as the dissipation of electrical and magnetic fields over distance. This misuse of HHMD technology creates conditions where gaps in security are prevalent and the level of safety anticipated by security planners is not met, leaving patrons and venues inadequately protected.

BRIEF SUMMARY OF THE INVENTION

The present invention provides a separation assembly suitable for use with handheld metal detectors.

According to a nonlimiting aspect of the invention, a separation assembly is mounted to a handheld metal detector having a blade containing transmission and receiver components of the handheld metal detector. The separation assembly includes at least a first separation member formed of a nonferromagnetic material and is spaced a lateral separation distance from the blade of the handheld metal detector.

Other aspects and advantages of this invention will be appreciated from the following detailed description.

BRIEF DESCRIPTION OF THE SEVERAL VIEWS OF THE DRAWING

FIGS. 1 through 3 schematically represent front, side, and perspective views of a handheld metal detector equipped with a separation assembly configured to promote the precision deployment of the handheld metal detector in accordance with a nonlimiting embodiment of this invention.

FIGS. 4 and 5 schematically represent isolated front and side views of the separation assembly of FIGS. 1 through 3.

DETAILED DESCRIPTION OF THE INVENTION

The intended purpose of the following detailed description of the invention and the phraseology and terminology employed therein is to describe what is shown in the drawings, which include the depiction of one or more nonlimiting embodiments of the invention, and to describe certain but not all aspects of the embodiment(s) depicted in the drawings. The following detailed description also describes certain investigations relating to the embodiment (s) depicted in the drawings identifies certain but not all alternatives of the embodiment(s). Therefore, the appended claims, and not the detailed description, are intended to particularly point out subject matter regarded as the invention, including certain but not necessarily all of the aspects and alternatives described in the detailed description.

The drawings schematically represent a separation assembly 12 configured to promote the precision deployment of a handheld metal detector (HHMD) 10. Furthermore, the HHMD 10 is represented in FIGS. 1 through 3 as equipped with visually warning lights 20 that indicate the presence of a metal object within a magnetic field generated by the HHMD 10, though the generation of an aural signal may be an alternative or additional feature of the HHMD 10 to indicate that a metallic object is within a magnetic field.

The separation assembly 12 is configured to compensate for the operational errors that can occur with the use of HHMDs, standardize the detection sensitivity of HHMDs, and close exploitable gaps in security practices that can exist when using an HHMD. In the nonlimiting example represented in the drawings, the separation assembly 12 attaches to the HHMD 10 to define a standard distance guide for a user (e.g., security personnel) to ensure a proper detection sensitivity is achieved and maintained during the personal screening of a targeted individual. The most common usage error associated with HHMDs is believed to result from a user placing the HHMD too close to a targeted individual during screening, sometimes even directly contacting the individual with the HHMD, the separation assembly 12 addresses this error to promote the proper use of the HHMD 10. The separation assembly 12 shown in FIGS. 1 through 5 is constructed to provide two bumper or separation members 14 on opposite sides of a housing (referred to herein as a blade) 16 of the HHMD 10 that contains at least some of the transmission and receiver components (not shown) of the HHMD 10. With the blade 16 therebetween, the separation members 14 serve to define a minimum lateral separation distance ($d_L$) between the blade 16 and the body of a targeted individual (not shown) being screened. It is foreseeable that the separation assembly 12 can comprise a single separation member 14 or more than two separation members 14 to ensure that a proper detection range can be maintained with no additional training or control management necessary. The separation assembly 12 can be used to effectively "set" the sensitivity of the detection circuitry of the HHMD 10 to existing security standards for large event venues. The lateral separation distance, $d_L$, of the HHMD 10 and the resulting detection capability of the HHMD 10 are discussed below. Prototypes of the separation assembly 12 showed reliable, consistent detection of threat items and pure metallic objects at a distance of about three inches (about 7.5 cm) between the HHMD 10 and the items/objects being targeted for screening.

Because an HHMD uses electromagnetic induction to produce a magnetic field, the separation assembly 12 preferably does not significantly interfere with the magnetic field. The material from which the separation assembly 12 is constructed should have a low level of permeability to reduce magnetic induction between the HHMD 10 and the separation assembly 12. Nonferromagnetic materials such as paper, wood, bone, glass, brass, liquids, air, cloth fibers, and plastics have a magnetic permeability of 1, meaning they are less susceptible to a magnetic field and have a strong resistance to the formation of a magnetic field.

A prototype of the separation assembly 12 represented in FIGS. 1 through 5 was constructed of a plastic material that was chosen on the basis of low cost, light weight, and durability. Specifically, separation members 14 each having a wire-like strand shape were fabricated from Lexan®, a branded polycarbonate polymer, which was selected for the separation assembly 12 because of its high impact resistance, low cost, light weight, easy thermoforming, and ability to maintain structural integrity after cutting and forming shapes. Each of the nonlimiting separation member 14 represented in FIGS. 1 through 5 generally has a U-shape and opposite ends of each separation member 14 are attached to the blade 16 and handle 18 of the HHMD 10. In FIGS. 1 through 5, the U-shape of each separation member 14 can be seen to generally define two legs 22 of approximately equal length and a center span 24 that adjoins and is longer than its corresponding leg 22. The center spans 24 of the separation members 14 can be seen to be approximately parallel to each other and to the blade 16, and the length ($L_{cs}$) of each span 24 is greater than the length of the blade 16. The lengths of the legs 22 associated with each center span 24 establish the minimum lateral separation distance, $d_L$, between the center span 24 of each separation member 14 from the nearest surface of the blade 16. In FIGS. 1 through 5, the length ($L_{cs}$) of each span 24 is enabled to be greater than the length of the blade 16 by means of attaching the distal legs 22 (distal relative to the handle 18) to the distal end of the blade 16, which in the nonlimiting embodiment shown is a shaped spacer 26 that is attached in some suitable manner to the distal legs 22 and to the distal end of the blade 16, such that the distal legs 22 (and therefore the distal ends of the separation members 14) are spaced an axial separation distance, $d_A$, from the distal end of the blade 16, as a nonlimiting example, one inch (about 2.5 cm) or more. The spacer 26 and the proximal legs 22 (proximal relative to the handle 18) are preferably fixed to the blade 16 and handle 18, respectively, by suitable attachment means, for example, an adhesive, mechanical fasteners, hook-and-loop fasteners, etc. As represented in FIGS. 1 through 5, each proximal leg 22 may be attached to or formed to comprise a base 28 to facilitate and strengthen its attachment to the handle 18. The shape, configuration, dimensions, and material of the separation members 14 described above resulted in a sufficiently rigid structure that resisted flexing when contacted by forces that would be anticipated during ordinary use of the HHMD 10.

Manufacturers of HHMDs and various experts in the security industry have identified different lateral separation distance ranges for different HHMDs, resulting in a source of confusion that has led to the misuse of HHMDs and the potential for security gaps. Investigations leading to the present invention utilized an HHMD commercially available from Garrett Electronics, Inc., under the name "Super Scanner®V," and utilized security standards currently in use for large events held in the U.S. Industry practice is to position the blade of an HHMD a distance of at least two inches (about 5 cm) from a targeted surface. On this basis, the lengths of the two legs 22 of each separation member 14 can be sized to establish a lateral separation distance, $d_L$, of about two inches between their associated center spans 24 and the nearest surface of the blade 16 of the HHMD used in the investigations. Because users (e.g., security personnel) of HHMDs are trained to scan a targeted surface without directly contacting the targeted surface with the HHMD, it was assumed that the separation assembly 12 will typically be separated approximately 0.5 inch (about 1.3 cm) from the body of a targeted individual. On this basis, a distance of three inches (about 7.5 cm) was selected as the testing distance between target surfaces and the nearest surface of the blade 16 of the HHMD used in the investigations.

During the investigations, various test items were used as "threat" items to be detected with the HHMD. Each threat item was taken from security plans and prohibited item lists from large venue events. These items included lock-blade knives of lengths ranging from two to four inches (about 5 to 10 cm), box cutters, pepper spray canister, laser pointers, "selfie" sticks, aerosol cans, and bike chains, as well as metallic test pieces (ranging in numbers from one to twenty-five). The testing protocol called for parity between HHMD detection performance and previously determined detection capabilities of walk-through metal detectors (WTMDs). The pure metallic test pieces included 0.25-inch metallic nuts weighing approximately 0.16 ounces. While specific threat items (or operations test pieces provided by some metal detector manufacturers) provide a clear detection capability status for individual items, a collection of pure metallic test pieces are able to simulate a range of metallic objects that would be prohibitive to include in extensive testing. Previous research has shown WTMDs at standard large event security settings to have a detection threshold of around twenty-five test pieces in laboratory conditions. Consequently, the investigations utilized a testing protocol that employed several levels of pure metallic test pieces (twenty-five, twenty, fifteen, ten, five, and one) to develop a clear picture of the over-detection conditions when HHMD users employ their equipment at sub-performance ranges. Lock-blade knives of two, three, and four-inch lengths were used to show security planners the range of items that could pass through their security procedures. Lock-blade knives may pass through WTMDs undetected due to their plastic hilts and low metallic content, while the particular HHMD used during the investigations was able to detect all but the two-inch blade knife under the specified testing conditions.

An adjustable height, non-metallic test rig on plastic wheels was constructed to enable the collection of multiple data points throughout the lateral separation distance (testing height) range for each threat item and incremental levels of pure metallic test pieces placed on a testing surface below the test rig. Additionally, a series of experiments was conducted assessing HHMD detection success with and without a separation assembly 12 to determine optimal detection ranges as well as possible magnetic field hindrance caused by the material of the separation assembly 12 and its separation members 14. To find an optimal detection range, each threat item and level of pure metallic test pieces was individually placed on the test surface. The HHMD was mounted to the testing rig and passed over the threat item three times. If the HHMD detected the object every time, it was recorded as consistent. If the detection was less, or the signal varied, it was recorded as intermittent. The height (distance) was increased until the signal changed from consistent to intermittent. Results of these experiments are tabulated in Tables 1 and 2 below. A comparison between the HHMD detection heights and detection capabilities of walk-through metal detectors led to a conclusion that an ideal screening distance for the HHMD used in the investigation was three inches (about 7.5 cm) between the blade of the HHMD and a threat item.

TABLE 1

HHMD detection threshold for pure metallic test pieces

| # of Test Pieces | Intermittent Detection (in) | Consistent Detection (in) |
|---|---|---|
| 25 | 4.875 | 3.125 |
| 20 | 4.25 | 3 |
| 15 | 3.5 | 2.25 |
| 10 | 3.25 | 1.875 |
| 5 | 2.5 | 1 |
| 1 | 1.25 | 0.5 |

TABLE 2

HHMD detection threshold for threat items

| Threat item | Intermittent Detection (in) | Consistent Detection (in) |
|---|---|---|
| 4-inch Knife | 4.875 | 4 |
| 3-inch Knife | 3.5 | 2 |
| 2-inch Knife | 3 | 2.125 |
| Box Cutter | 2.5 | 1.25 |
| Pepper Spray | 3.25 | 2.5 |
| Bike Chain | 5.5 | 4.25 |
| Aerosol Can | 5.75 | 4.875 |
| Selfie stick | 5 | 3.875 |
| Laser pointer | 2.5 | 1.375 |

Table 1 shows the height/distance at which the pure metallic test pieces were detected while Table 2 shows the detection range for the threat items. As expected, for the test pieces to be consistently detected, the distance was lower than that of intermittent detection, as seen from the results in both Tables 1 and 2. As the number of test pieces decreased in Table 1, the intermittent and consistent detection distance also decreased due to the diminished metallic signature.

The HHMD detection for pure metallic test pieces proved to be nearly consistent with walk-through metal detector performance when selecting an ideal screening distance of three inches. This range allows for smaller, non-threat items, to remain undetected, while consistently detecting larger metallic objects that could threaten large group security. The data in Table 2 evidence that the threat item detection for the HHMD also proved consistent with walk-through metal detector performance at a range of three inches. Based on these results, the prototypes of the separation assembly 12 shown in FIGS. 1 through 5 were constructed with a width of three inches to optimize HHMD success.

For success of the separation assembly 12, the material from which the separation assembly 12 is constructed should not interfere with the magnetic field produced by the HHMD. If the material had ferromagnetic particles, the HHMD could read false positives during a scan and lengthen the security process by prompting the user to attempt to find a phantom metallic object. To ensure equal detection with and without the separation assembly 12, pure metallic pieces and threat objects were detected at three inches to determine consistent and intermittent status. These experiments were only conducted with the prototype configured similarly to that represented in FIGS. 1 through 5, whose separation assembly 12 was formed of polycarbonate. Table 3 confirmed an optimal detection distance of three inches as the smaller groups of metallic objects (representative of non-threat items such as zippers and key chains) were intermittently or not detected. The consistent detection, and avoidance of over detection, allows for more effective and efficient use of security personnel, and brings their performance in line with the expectations of security planners.

TABLE 3

HHMD detection for metallic test pieces with and without a separation assembly

| # of Test Pieces | Detection Status | |
| --- | --- | --- |
| | Without a separation assembly | With a separation assembly |
| 25 test pieces | Consistent | Consistent |
| 20 test pieces | Consistent | Consistent |
| 15 test pieces | Consistent | Consistent |
| 10 test pieces | Consistent | Consistent |
| 5 test pieces | Intermittent | Intermittent |
| 1 test piece | Not detected | Not detected |

TABLE 4

HHMD detection for threat items with and without a separation assembly

| Threat item | Detection Status | |
| --- | --- | --- |
| | Without a separation assembly | With a separation assembly |
| 4-inch knife | Consistent | Consistent |
| 3-inch knife | Consistent | Consistent |
| 2-inch knife | Not detected | Not detected |
| Box cutter | Consistent | Consistent |
| Pepper spray | Not detected | Not detected |
| Bike chain | Consistent | Consistent |
| Aerosol can | Consistent | Consistent |
| Laser pointer | Not detected | Not detected |

As seen in both Tables 3 and 4, the HHMD showed the same detection status with and without the separation assembly, evidencing a passive relationship between the HHMD and separation assembly, removing the possibility of unnecessary screening time. Some items did go undetected due to minimal metallic presence.

The benefit of the separation assembly 12 is to provide adequate training and guidance for HHMD users and improve operational success. Inaccurate scanning distances can cause unnecessary rescreening or enable threat items to pass through undetected, posing a threat to large group security. The separation assembly 12 is capable of ensuring accurate detection range so that innocuous items go unnoticed while larger "threat" items are consistently detected. With installation of the separation assembly 12 and proper screening patterns, users of all experience levels can produce consistent positive detections of threat items.

The separation assembly 12 constructed of two or more strand-shaped separation members 14 formed of a polymer (polycarbonate) material was durable and resistant to shape changes if impacted, providing accurate results upon deployment. The experiments reported above evidence that there was a passive relationship between the polycarbonate material and the magnetic field of the HHMD as detection characteristics went unchanged with and without the separation assembly 12.

Various modifications and embodiments are foreseeable on the basis of the investigations. The separation assembly 12 can comprise any number of separation members 14 of various cross-sectional shapes, and various means can be used to secure the separation assembly 12 to an HHMD, for example, a separation assembly 12 whose separation members 14 are biased inward to apply a clamping effect to the HHMD. The separation assembly 12 could incorporate adjustable spacers or attachments capable of adjusting the lateral separation distance. Furthermore, it is foreseeable that the separation assembly 12 could be incorporated as a permanent and integrated part of an HHMD, or could be separately manufactured and installed on an HHMD.

While the invention has been described in terms of particular embodiments and investigations, it should be apparent that alternatives could be adopted by one skilled in the art. For example, the separation assembly 12 and its components could differ in appearance and construction from the embodiments described herein and shown in the drawings, functions of certain components of the separation assembly 12 could be performed by components of different construction but capable of a similar (though not necessarily equivalent) function, and appropriate materials could be substituted for those noted. As such, it should be understood that the intent of the above detailed description is to describe the particular embodiments represented in the drawings and certain but not necessarily all features and aspects thereof, and to identify certain but not necessarily all alternatives to the particular embodiment represented in the drawings. As a nonlimiting example, the invention encompasses additional or alternative embodiments in which one or more features or aspects of the illustrated embodiment could be eliminated or two or more features or aspects of different described embodiments could be combined. Accordingly, it should be understood that the invention is not necessarily limited to any particular embodiment described herein or illustrated in the drawings. It should also be understood that the purpose of the above detailed description and the phraseology and terminology employed therein is to describe the illustrated embodiment represented in the drawings, as well as investigations relating to the particular embodiments, and not necessarily to serve as limitations to the scope of the invention. Therefore, the scope of the invention is to be limited only by the claims.

The invention claimed is:

1. A separation assembly mounted to a handheld metal detector having a blade containing transmission and receiver components of the handheld metal detector, the separation assembly comprising:
   at least a first separation member formed of a nonferromagnetic material, the first separation member being spaced a lateral separation distance from the blade of the handheld metal detector, wherein the first separation member is U-shaped comprising a center span that is parallel to the blade of the handheld metal detector and spaced the lateral separation distance from the blade by at least two legs.

2. The separation assembly according to claim 1, wherein the lateral separation distance is at least 5 centimeters.

3. The separation assembly according to claim 1, further comprising a spacer that spaces a distal end of the first separation member an axial separation distance from an adjacent distal end of the blade of the handheld metal detector.

4. The separation assembly according to claim 3, wherein the axial separation distance is 2.5 centimeters or more.

5. The separation assembly according to claim 1, wherein the first separation member is a strand-shaped member.

6. The separation assembly according to claim 1, wherein the separation assembly is a permanent and integrated part of the handheld metal detector.

7. The separation assembly according to claim 1, wherein the separation assembly is separately manufactured and installed on the handheld metal detector.

8. The separation assembly according to claim 1, wherein the separation assembly comprises at least a second separation member formed of a nonferromagnetic material and spaced at least the lateral separation distance from the blade of the handheld metal detector.

9. The separation assembly according to claim 8, wherein the second separation member is opposite the first separation member relative to the blade such that the blade is between the first and second separation members.

10. The separation assembly according to claim 8, wherein the second separation member is U-shaped comprising a center span that is parallel to the blade of the handheld metal detector and spaced the lateral separation distance from the blade by at least two legs.

11. The separation assembly according to claim 8, wherein the second separation member is a strand-shaped member.

12. The separation assembly according to claim 8, wherein the separation assembly is a permanent and integrated part of the handheld metal detector.

13. The separation assembly according to claim 8, wherein the separation assembly is separately manufactured and installed on the handheld metal detector.

14. A separation assembly mounted to a handheld metal detector having a blade containing transmission and receiver components of the handheld metal detector, the separation assembly comprising:
 a first separation member formed of a nonferromagnetic material, the first separation member being spaced a lateral separation distance from the blade of the handheld metal detector; and
 a second separation member formed of a nonferromagnetic material and spaced at least the lateral separation distance from the blade of the handheld metal detector.

15. The separation assembly according to claim 14, wherein the lateral separation distance is at least 5 centimeters.

16. The separation assembly according to claim 14, further comprising a spacer that spaces distal ends of the first and second separation members an axial separation distance from an adjacent distal end of the blade of the handheld metal detector.

17. The separation assembly according to claim 16, wherein the axial separation distance is 2.5 centimeters or more.

18. The separation assembly according to claim 14, wherein the first and second separation members are strand-shaped members.

19. The separation assembly according to claim 14, wherein the second separation member is opposite the first separation member relative to the blade such that the blade is between the first and second separation members, and the second separation member is U-shaped comprising a center span that is parallel to the blade of the handheld metal detector and spaced the lateral separation distance from the blade by at least two legs.

* * * * *